(12) United States Patent
Kanamori et al.

(10) Patent No.: US 11,323,050 B2
(45) Date of Patent: May 3, 2022

(54) POWER SUPPLY APPARATUS

(71) Applicant: Toshiba Carrier Corporation, Kawasaki (JP)

(72) Inventors: Masaki Kanamori, Fuji (JP); Keiichi Ishida, Fuji (JP); Yohei Kubota, Fuji (JP); Kenta Yamamoto, Fuji (JP)

(73) Assignee: TOSHIBA CARRIER CORPORATION, Kawasaki (JP)

( * ) Notice: Subject to any disclaimer, the term of this patent is extended or adjusted under 35 U.S.C. 154(b) by 228 days.

(21) Appl. No.: 15/478,524

(22) Filed: Apr. 4, 2017

(65) Prior Publication Data

US 2017/0288578 A1 Oct. 5, 2017

(30) Foreign Application Priority Data

Apr. 4, 2016 (JP) .............................. JP2016-075144

(51) Int. Cl.
| | |
|---|---|
| *H02P 6/14* | (2016.01) |
| *H02M 1/44* | (2007.01) |
| *H02M 1/42* | (2007.01) |
| *H02P 27/06* | (2006.01) |
| *H02M 1/32* | (2007.01) |

(Continued)

(52) U.S. Cl.
CPC ................ *H02P 6/14* (2013.01); *H02M 1/32* (2013.01); *H02M 1/4225* (2013.01); *H02M 1/44* (2013.01); *H02M 5/458* (2013.01); *H02P 27/06* (2013.01); *H02M 1/0032* (2021.05); *H02M 1/348* (2021.05); *H02P 2201/09* (2013.01); *Y02B 70/10* (2013.01)

(58) Field of Classification Search
CPC ........ H02P 6/14; H02P 23/0018; H02P 31/00; H02P 29/60; H02M 1/32; H02M 5/458; H02K 11/25; H02K 11/33; H02K 1/12; H02K 1/22; H02K 9/04; H02K 9/193; H02K 1/04; H02K 2213/09; H02K 2201/03
USPC ......................................................... 318/400
See application file for complete search history.

(56) References Cited

U.S. PATENT DOCUMENTS 5,038,266 A * 8/1991 Callen ..................... G05F 1/563
                                                                363/89
5,341,085 A * 8/1994 Ettes ..................... H02M 3/156
                                                                323/222

(Continued)

FOREIGN PATENT DOCUMENTS

| CN | 201726311 U  *  1/2011 |
| JP | S61-273168         12/1986 |

(Continued)

OTHER PUBLICATIONS

Feb. 25, 2020 Japanese official action (and English translation thereof) in connection with Japanese patent application No. 2016-075144.

*Primary Examiner* — Muhammad S Islam
*Assistant Examiner* — Devon A Joseph
(74) *Attorney, Agent, or Firm* — John P. White

(57) ABSTRACT

According to one embodiment, the controller configured to, when an operation of the boosting circuit is in the boosting mode, and if an instantaneous value Ia of a current flowing through the reactor lowers to a value smaller than or equal to a set value Ias, switch the operation of the boosting circuit from the boosting mode to the non-boosting mode.

8 Claims, 6 Drawing Sheets

(51) Int. Cl.
  *H02M 5/458* (2006.01)
  *H02M 1/00* (2006.01)
  *H02M 1/34* (2007.01)

(56) References Cited

U.S. PATENT DOCUMENTS

| | | | | |
|---|---|---|---|---|
| 5,745,351 | A * | 4/1998 | Taurand | H02M 3/33584 363/20 |
| 6,194,880 | B1 * | 2/2001 | Fraidlin | H02M 3/1588 323/222 |
| 6,275,014 | B1 * | 8/2001 | Sudo | H02M 3/158 323/222 |
| 7,002,323 | B2 * | 2/2006 | Natori | H02M 3/158 323/225 |
| 7,208,928 | B2 * | 4/2007 | Nebrigic | H02M 3/1563 323/285 |
| 7,315,460 | B2 * | 1/2008 | Kyono | H02M 1/38 363/16 |
| 7,391,631 | B2 * | 6/2008 | Shimada | H02M 3/157 363/89 |
| 7,903,442 | B2 * | 3/2011 | McDonald | H02M 7/217 363/127 |
| 8,089,780 | B2 * | 1/2012 | Mochikawa | H02M 7/5388 363/17 |
| 9,001,540 | B2 * | 4/2015 | Nishibori | H02M 1/4208 363/89 |
| 9,030,185 | B2 * | 5/2015 | Nishibori | G05F 1/70 323/285 |
| 9,083,259 | B2 * | 7/2015 | Nishibori | H02M 1/4225 |
| 9,112,421 | B2 * | 8/2015 | Murayama | H02M 3/33569 |
| 9,257,248 | B2 * | 2/2016 | Mochikawa | H01H 47/00 |
| 9,397,370 | B2 * | 7/2016 | Nebrigic | H01M 10/44 |
| 9,450,502 | B2 * | 9/2016 | Sakakibara | H02M 5/458 |
| 9,577,534 | B2 * | 2/2017 | Ishizeki | H02M 1/42 |
| 9,800,077 | B2 * | 10/2017 | Hatakeyama | H02J 7/0026 |
| 9,804,621 | B2 * | 10/2017 | Dally | H02M 3/158 |
| 9,816,737 | B2 * | 11/2017 | Kamiya | H02M 7/217 |
| 9,893,509 | B2 * | 2/2018 | Mochikawa | G05F 3/02 |
| 9,935,569 | B2 * | 4/2018 | Tsumura | H02P 6/28 |
| 10,003,331 | B2 * | 6/2018 | Ikeda | H01L 29/872 |
| 2002/0131278 | A1 * | 9/2002 | Hendrix | H02M 1/4225 363/21.06 |
| 2003/0218448 | A1 * | 11/2003 | Lidak | H02M 1/4225 323/222 |
| 2005/0041440 | A1 * | 2/2005 | Natori | H02M 3/158 363/21.01 |
| 2006/0291117 | A1 * | 12/2006 | Kyono | H02M 1/38 361/90 |
| 2007/0217233 | A1 * | 9/2007 | Lim | H02M 5/4585 363/43 |
| 2008/0130336 | A1 * | 6/2008 | Taguchi | H02M 3/157 363/125 |
| 2009/0003021 | A1 * | 1/2009 | Tsukamoto | H02M 3/1588 363/74 |
| 2009/0303751 | A1 * | 12/2009 | Usui | H02M 3/1584 363/15 |
| 2010/0321966 | A1 * | 12/2010 | Mochikawa | H02M 1/08 363/123 |
| 2011/0057510 | A1 * | 3/2011 | Yamashita | B60L 1/003 307/10.1 |
| 2012/0249059 | A1 * | 10/2012 | Matsumae | H02M 3/337 320/107 |
| 2013/0016539 | A1 * | 1/2013 | Nishibori | H02M 1/4225 363/44 |
| 2013/0134958 | A1 * | 5/2013 | Mochikawa | H01H 47/00 323/311 |
| 2013/0135904 | A1 * | 5/2013 | Murayama | H02M 3/33561 363/17 |
| 2013/0207621 | A1 * | 8/2013 | Nishibori | G05F 1/70 323/205 |
| 2014/0036561 | A1 * | 2/2014 | Sakurai | H02M 7/06 363/126 |
| 2014/0098583 | A1 * | 4/2014 | Nishibori | H02M 1/4208 363/89 |
| 2014/0197741 | A1 * | 7/2014 | Sakai | H05B 45/3575 315/123 |
| 2014/0223949 | A1 * | 8/2014 | Sakae | H02M 3/1584 62/324.1 |
| 2014/0327457 | A1 * | 11/2014 | Diewald | H02M 3/1582 324/713 |
| 2015/0311811 | A1 * | 10/2015 | Seok | H01L 23/49562 29/854 |
| 2016/0134098 | A1 * | 5/2016 | Mochikawa | H01H 47/00 307/113 |
| 2016/0241073 | A1 * | 8/2016 | Hatakeyama | H02J 7/0072 |
| 2016/0245571 | A1 * | 8/2016 | Shinomoto | F25D 11/00 |
| 2016/0265822 | A1 * | 9/2016 | Kamiya | H02M 1/32 |
| 2016/0285386 | A1 * | 9/2016 | Kataoka | H03K 17/122 |
| 2016/0294312 | A1 * | 10/2016 | Tsumura | H02M 5/458 |
| 2017/0141709 | A1 * | 5/2017 | Fukuda | F25B 49/025 |
| 2017/0201186 | A1 * | 7/2017 | Yuasa | H02M 1/14 |
| 2017/0288578 | A1 * | 10/2017 | Kanamori | H02P 27/06 |
| 2017/0302200 | A1 * | 10/2017 | Marcinkiewicz | H02M 1/42 |
| 2017/0331394 | A1 * | 11/2017 | Kubouchi | H02M 7/537 |
| 2018/0034403 | A1 * | 2/2018 | Kim | H02P 23/26 |
| 2019/0149044 | A1 * | 5/2019 | Itoh | H02M 3/07 363/123 |

FOREIGN PATENT DOCUMENTS

| | | |
|---|---|---|
| JP | H5-38146 A | 2/1993 |
| JP | 2004-88941 A | 3/2004 |
| JP | 2009-038875 A | 2/2009 |
| JP | 2012-135162 A | 7/2012 |
| JP | 2014-11907 A | 1/2014 |
| JP | 2015-133874 A | 7/2015 |
| JP | 2015-139282 A | 7/2015 |
| WO | WO 2015/079762 A1 | 6/2015 |

* cited by examiner

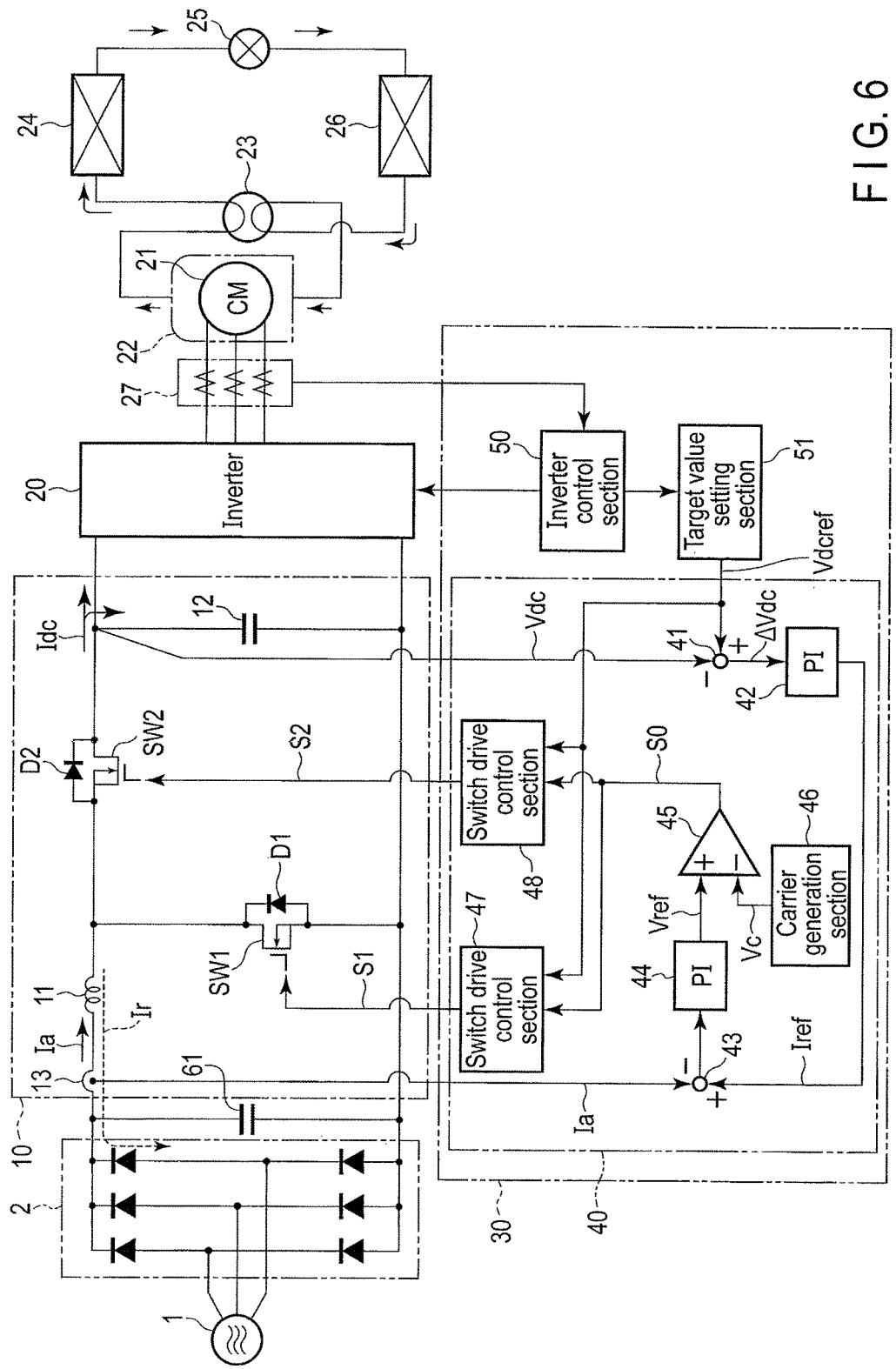
F I G. 6

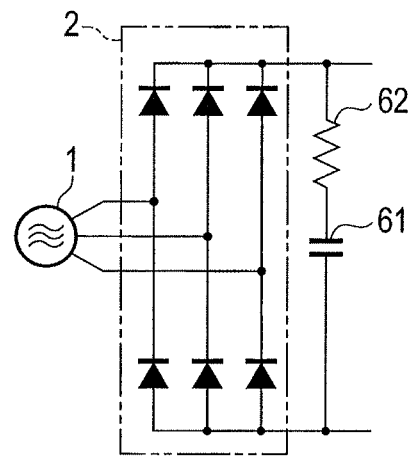
F I G. 7
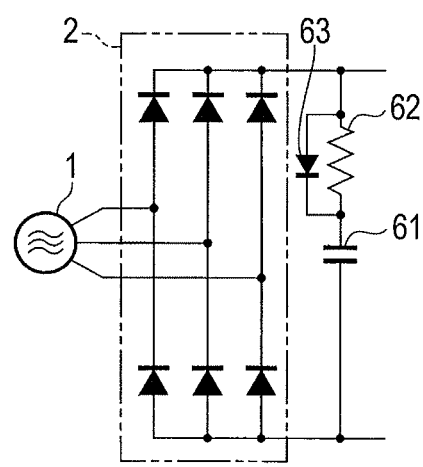
F I G. 8

POWER SUPPLY APPARATUS

CROSS-REFERENCE TO RELATED APPLICATIONS

This application is based upon and claims the benefit of priority from Japanese Patent Application No. 2016-075144, filed Apr. 4, 2016, the entire contents of which are incorporated herein by reference.

FIELD

Embodiments described herein relate generally to a power supply apparatus to be incorporated in, for example, an air conditioning apparatus including a refrigerating cycle, heat source apparatus, and the like.

BACKGROUND

A power supply apparatus to be incorporated in an air conditioning apparatus including a refrigerating cycle, heat source apparatus, and the like includes a rectifier circuit configured to rectify a voltage of an alternating-current power source, boosting circuit configured to boost the output voltage of the rectifier circuit, inverter configured to convert the output voltage of the boosting circuit into an AC voltage of a predetermined frequency to thereby supply the AC voltage to a compressor motor bf the refrigerating cycle, and the like.

The boosting circuit includes a series circuit constituted of a reactor and first switch element, and connected to output ends of the rectifier circuit, backflow prevention diode arranged in a current path between the first switch element and the inverter which is a load of the boosting circuit, and capacitor connected in parallel with the load, and boosts the output voltage of the rectifier circuit by repetitively turning on/off the first switch element (Jpn. Pat. Appin. KOKAI Publication No. 2009-38875).

The above-mentioned diode has a voltage drop with respect to a current flowing in the forward direction although the amount of the voltage drop is small. This voltage drop leads to power loss of the boosting circuit, and cannot be neglected from the viewpoint of energy saving promotion.

As a countermeasure, it is conceivable to connect a second switch element in which the resistance value in the on-state is small, and the on-state power loss is small in parallel with the aforementioned diode, and make the second switch element operate complementary to the first switch element in such a manner that the second switch element is made off when the first switch element is on, and is made on when the first switch element is off to thereby shorten the period during which a forward current flows through the aforementioned diode and reduce the power loss caused by the diode. As each of the first and second switch elements, a metal oxide semiconductor field effect transistor (MOSFET) through which a current can be made to flow in both directions in the on-state is used.

When the first and second switch elements are turned on at the same instant, a short-circuit current flows through a path bypassing the backflow prevention diode, and leading from the capacitor and passing through the first and second switch elements. In order to prevent this short-circuit current from flowing, when one of the first and second switch elements is turned from off to on, so-called dead time during which both the first and second switch elements are in the off-state for an extremely short time is secured. Only during the period of the dead time, a current flows through the aforementioned diode.

A current flowing through the aforementioned reactor (called a reactor current Ia) becomes pulsatile concomitantly with the turning on/off of the first switch element. Further, when the load becomes light for the reason that the operational state of the refrigerating cycle suddenly changes or the rotational speed of the compressor in the refrigerating cycle sharply decreases, the reactor current Ia lowers to zero or to a level close to zero.

It has been found that when the second switch element is switched from off to on in a state where the level of the reactor current Ia is "0" or is low in the vicinity of "0", a reverse recovery current occurs in the diode elements of the rectifier circuit and, concomitantly with this, the reactor current Ia flows in the negative direction in some cases. The reactor current Ia flowing in the negative direction is called a negative reactor current −Ia.

More specifically, when the second switch element is turned on in the state where the level of the reactor current is "0" or is low in the vicinity of "0", the voltage (boosted voltage) of the aforementioned capacitor is added to the diode elements of the rectifier circuit through the second switch element as a reverse voltage because the second switch element is a MOSFET capable of making a current flow in both directions when the second switch element is in the on-state. Normally, although a diode element does not make a current flow in the reverse direction, when a reverse voltage is applied to the diode element through which a current has so far been made to flow in the forward direction, a reverse current (called a reverse recovery current) flows through the diode element although the duration time of the flow is short. After the reverse recovery current reaches a peak value, the rate of change with time (di/dt) of the negative reactor current −Ia abruptly changes from a negative value to a positive value. At this time, a large counter-electromotive force is generated in the reactor, and an excessive surge voltage resulting from the counter-electromotive force is created across the both ends of the reactor. When an exorbitant voltage formed by adding the surge voltage and the voltage of the capacitor together is applied to the output ends of the rectifier circuit, the diode elements of the rectifier circuit are broken in some cases.)

BRIEF DESCRIPTION OF THE DRAWINGS

FIG. 6 is a block diagram showing the configuration of second and third embodiments.

FIG. 7 is a view showing the configuration of a main part of a fourth embodiment.

FIG. 8 is a view showing the configuration of a main part of a fifth embodiment.

DETAILED DESCRIPTION

In general, according to one embodiment, a power supply apparatus includes a rectifier circuit configured to rectify an AC voltage; a boosting circuit including a series circuit constituted of a reactor and a first switch element and connected to output ends of the rectifier circuit, a first diode connected in reversely parallel with the first switch element, a second diode for backflow prevention arranged in a current path between the first switch element and a load, a second switch element connected in parallel with the second diode, and a capacitor connected in parallel with the load, and possessing a function of a boosting mode in which an output voltage of the rectifier circuit is boosted, and a function of a non-boosting mode in which the output voltage of the rectifier circuit is output without being boosted; and a controller configured to, when an operation of the boosting circuit is in the boosting mode, and if an instantaneous value Ia of a current flowing through the reactor lowers to a value smaller than or equal to a set value Ias, switch the operation of the boosting circuit from the boosting mode to the non-boosting mode.

[1] First Embodiment

A first embodiment will be described below by taking a power supply apparatus to be incorporated in an air conditioning apparatus including a refrigerating cycle as an example.

Figure 1:
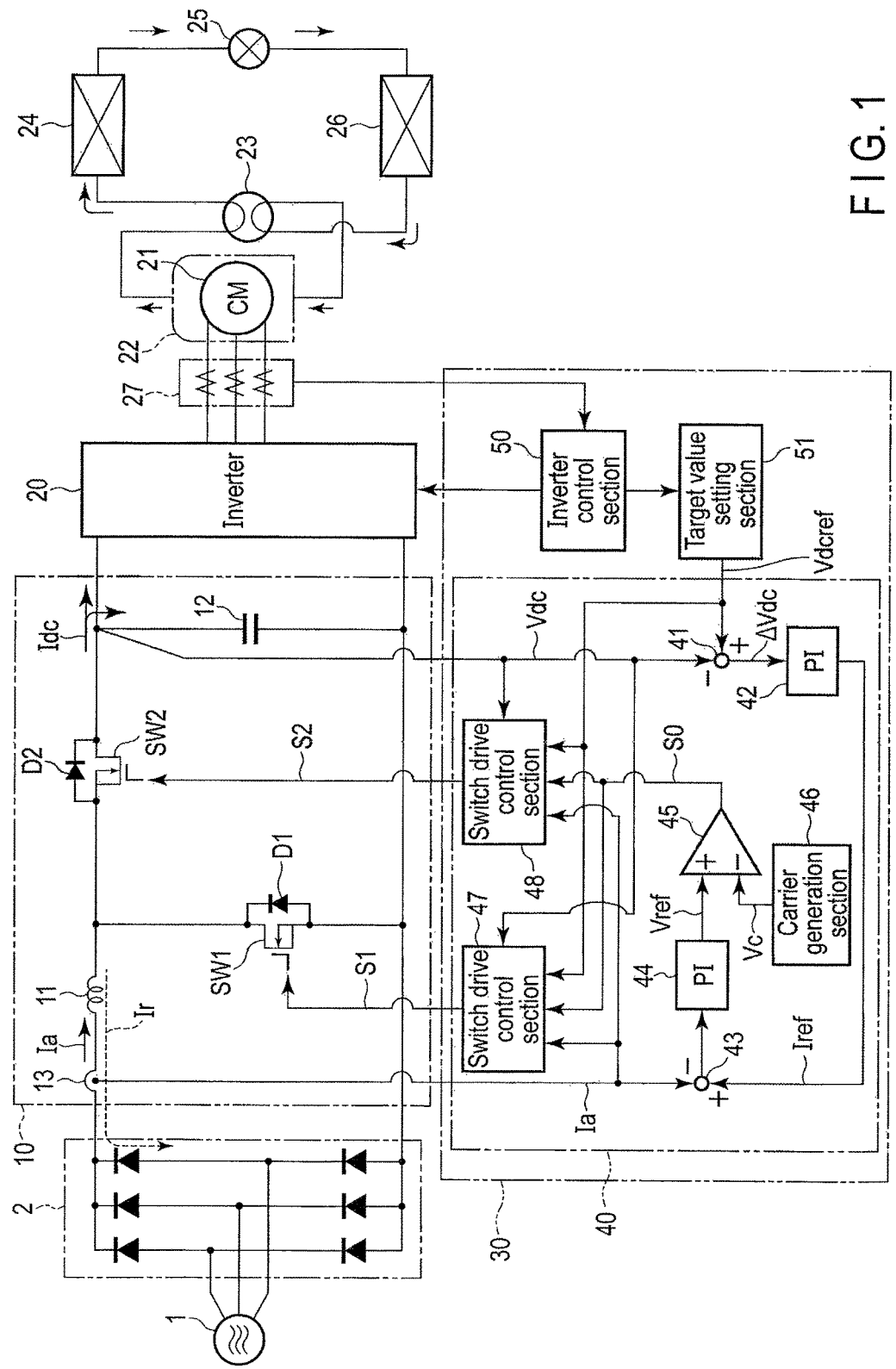
FIG. 1 is a block diagram showing the configuration of a first embodiment.

As shown in FIG. 1, a diode-bridge full-wave rectifier circuit 2 is connected to a three-phase alternating current (AC) source 1, and a boosting circuit 10 is connected to output ends of the full-wave rectifier circuit 2. The full-wave rectifier circuit 2 includes bridge-connected diode elements 2a to 2f, and subjects the voltage of the three-phase AC source to full-wave rectification by means of these diode elements 2a to 2f.

The boosting circuit 10 includes a series circuit constituted of a reactor 11 and switch element (first switch element) SW1 and connected to the output ends of the full-wave rectifier circuit 2, diode (first diode) D1 connected in reversely parallel with the switch element SW1, backflow prevention diode (second diode) D2 arranged in a current path between the first switch element SW1 and an inverter 20 which is a load of the boosting circuit 10, switch element (second switch element) SW2 connected in parallel with the diode D2, and smoothing capacitor (electrolytic capacitor) 12 connected in parallel with the load (inverter 20), and has a function of a boosting mode in which the output voltage of the full-wave rectifier circuit 2 is boosted, and a function of a non-boosting mode in which the output voltage of the full-wave rectifier circuit 2 is output without being boosted. In the boosting circuit 10, in the boosting mode, while the switch element SW1 is repetitively turned on/off (intermittently turned on), the switch element SW2 is repetitively turned on/off (intermittently turned on) oppositely out of phase with the turning on/off of the switch element SW1. That is, the switch element SW2 is turned off when the switch element SW1 is in the on-state, and the switch element SW2 is turned on when the switch element SW1 is in the off-state. In the boosting circuit 10, in the non-boosting mode, the switch element SW1 is continuously kept in the off-state, and the switch element SW2 is continuously kept in the on-state. The switch element SW1 is also called a lower-phase side switch element, and the switch element SW2 is also called an upper-phase side switch element.

The switch element SW1 is a super-junction MOSFET in which a parasitic diode connected in reversely parallel with the switch element main body is included, and the resistance value in the on-state is small. The parasitic diode of the switch element SW1 is used as it is as the aforementioned diode (first diode) D1. The switch element SW1 is on/off-driven by a drive signal S1 supplied from a controller 30.

The switch element SW2 is a semiconductor switch element which includes a parasitic diode connected in reversely parallel with the switch element main body, and has bidirectionality allowing a current to flow in both directions between the drain and the source in the on-state, and in which the power loss in the on-state is smaller than the power loss caused by a voltage drop in the forward direction of the parasitic diode (diode D2). As this switch element SW2, as in the case of the switch element SW1, a super-junction MOSFET in which the resistance value in the on-state is small is used. The parasitic diode of the switch element SW2 is used as it is as the aforementioned backflow prevention diode (second diode) D2. The switch element SW2 is on/off-driven by a drive signal S2 supplied from the controller 30 oppositely out of phase with the on/off-driving of the switch element SW1.

To the output ends of the boosting circuit 10, the inverter 20 which is the load thereof is connected. The inverter 20 converts the output voltage of the boosting circuit 10 into an AC voltage by switching, and outputs the AC voltage as the driving power to be supplied to the motor 21. The motor 21 is a drive motor of the compressor 22, and is, for example, a brushless DC motor which is an inductive load, and is operated by the output of the inverter 20.

The compressor 22 sucks and compresses a refrigerant and discharges the compressed refrigerant. One end of an outdoor heat exchanger 24 is connected to a refrigerant exhaust port of the compressor 22 through a four-way valve 23, and the other end of the outdoor heat exchanger 24 is connected to one end of an indoor heat exchanger 26 through an expansion valve 25. The other end of the indoor heat exchanger 26 is connected to a refrigerant suction port of the compressor 22 through the four-way valve 23. The compressor 22, four-way valve 23, outdoor heat exchanger 24, expansion valve 25, and indoor heat exchanger 26 constitute a heat-pump refrigerating cycle of the air conditioning apparatus. Arrows in FIG. 1 indicate a flow of the refrigerant at the time of cooling, and the high-temperature refrigerant discharged from the compressor radiates heat in the outdoor heat exchanger 24, and absorbs heat in the indoor heat exchanger 26 to cool the inside of the room. That is, the indoor heat exchanger 26 acts as a heat sink, and the outdoor heat exchanger 24 acts as a radiator. When the four-way valve 23 is reversed, the flow of the refrigerant is reversed, and a heating operation can be carried out. In this case, heat radiation is carried out in the indoor heat exchanger 26 to thereby warm the inside of the room, and absorption of heat is carried out in the outdoor heat exchanger 24.

In the current path between the positive side output end of the full-wave rectifier circuit 2 and the reactor 11 of the boosting circuit 10, a current sensor 13 configured to detect a current (instantaneous value) Ia flowing through the reactor 11 is arranged. The current (instantaneous value) Ia detected by the current sensor 13 is hereinafter called a reactor current Ia. In the current path between the inverter 20 and the motor 21, a current sensor 27 configured to detect currents (phase-winding currents) flowing through the motor 21 is arranged. Detection results of these current sensors 13 and 27 are supplied to the controller 30 and, at the same time, an output voltage (voltage across both ends of the capacitor 12) Vdc of the boosting circuit 10 is detected by the controller 30.

The controller 30 includes a boosting control section 40, inverter control section 50, and target value setting section 51.

The boosting control section 40 is a section configured to subject the switching of the boosting circuit 10 to pulse-width modulation (PWM) control in such a manner that the output voltage (voltage across both ends of the capacitor 12) Vdc of the boosting circuit 10 becomes the target value Vdcref, and that the current (reactor current) Ia input to the boosting circuit 10 becomes constant, and includes a subtraction section 41, PI control section 42, subtraction section 43, PI control section 44, PWM signal generation section 45, carrier generation section 46, and switch drive control sections 47 and 48.

The subtraction section 41 obtains a difference ΔVdc between the output voltage Vdc of the boosting circuit 10 and the target value Vdcref. The PI control section 42 obtains a current command value Iref for the current (reactor current) Ia input to the boosting circuit 10 by a proportional integral operation using the difference ΔVdc obtained by the subtraction section 41 as an input. The subtraction section 43 obtains a difference ΔIa between the current command value Iref obtained by the PI control section 42 and the current (detection current of the current sensor 13) Ia input to the boosting circuit 10. The PI control section 44 obtains a voltage command value Vref for pulse width modulation by a proportional integral operation using the difference ΔIa obtained by the subtraction section 43 as an input. The carrier generation section 46 generates a triangular wave-like carrier signal voltage Vc of a predetermined frequency. The PWM signal generation section 45 subjects the carrier signal voltage Vc generated by the carrier generation section 46 to pulse width modulation (voltage comparison) by using the voltage command value Vref obtained by the PI control section 44 to thereby generate a pulsed PWM signal SO for switching prepared for the switch elements SW1 and SW2 of the boosting circuit 10.

When the target value Vdcref to be set by the target value setting section 51 is greater than or equal to the predetermined value (at the time of a high/medium load), the switch drive control section 47 generates and outputs a drive signal S1 in phase with the PWM signal SO generated by the PWM signal generation section 45 as a signal for driving of the switch element SW1. When the target value Vdcref to be set by the target value setting section 51 is greater than or equal to the predetermined value (at the time of a high/medium load), the switch drive control section 48 generates and outputs a drive signal S2 opposite in phase to the PWM signal SO generated by the PWM signal generation section 45 as a signal for driving of the switch element SW2. By the output of these drive signals S1 and S2, the boosting circuit 10 operates in the boosting mode.

Further, when the target value Vdcref to be set by the target value setting section 51 is smaller than the predetermined value (at the time of a low load), the switch drive control section 47 generates and outputs a drive signal S1 configured to make the switch element SW1 continuously in the off-state. When the target value Vdcref to be set by the target value setting section 51 is smaller than the predetermined value (at the time of a low load), the switch drive control section 48 generates and outputs a drive signal S2 configured to make the switch element SW2 continuously in the on-state. By the output of these drive signals S1 and S2, the switch element SW1 is continuously kept in the off-state, and hence boosting is not carried out and the boosting circuit 10 is placed in the non-boosting mode.

Particularly, the switch drive control sections 47 and 48 respectively generate drive signals S1 and S2 in such a manner that the switch element SW2 switches from the on-state to the off-state before the switch element SW1 switches from the off-state to the on-state, i.e., in such a manner that the so-called dead time during which both the switch elements SW1 and SW2 are in the off-state is secured between the timing at which the switch element SW1 switches from the off-state to the on-state and the timing at which the switch element SW2 switches from the on-state to the off-state, and further, in such a manner that the switch element SW2 switches from the off-state to the on-state after the switch element SW1 switches from the on-state to the off-state, i.e., in such a manner that the so-called dead time during which both the switch elements SW1 and SW2 are in the off-state is secured between the timing at which the switch element SW1 switches from the on-state to the off-state and the timing at which the switch element SW2 switches from the off-state to the on-state.

Furthermore, the switch drive control sections 47 and 48 respectively carry out switching between the boosting mode and the non-boosting mode according to the following system. The switch drive control sections 47 and 48 switch to the boosting mode when the effective value Iam of the reactor current Ia becomes greater than the set value Iams in the non-boosting mode. Furthermore, the switch drive control sections 47 and 48 switch to the non-boosting mode when the effective value Iam of the reactor current Ia lowers to a value smaller than or equal to the set value "Iams-α". This is because in the state where the current effective value is small, the inverter configured to drive the compressor originally requires no boosting, and conversely, if boosting is carried out, the switching loss concomitant with the on/off operation of the switch element SW2 is increased by the boosting.

Furthermore, each of the switch drive control sections 47 and 48 includes a protection control means for, when lowering of the reactor current (instantaneous value) Ia to a value smaller than the set value Iasis detected in the boosting mode, prohibiting the boosting circuit 10 from being in the boosting mode to thereby place the boosting circuit 10 in the non-boosting mode. The effective value Iam of the reactor current Ia is obtained from the instantaneous current value corresponding to several cycles of the AC source by calculation. The set value Iams is, for example, 12 A, and the set value Ias is, for example, 3 A. Further, "α" is a set value set in advance so as to function as hysteresis for preventing frequent switching between the boosting mode and the non-boosting mode from being carried out, and for example, a large value of about 50% (=6 A) of the set value Ias is set as α. The subtraction section 41 and the PI control section 42 function as a voltage control system. The subtraction section 43 and the PI control section 44 function as a current control system. By the voltage control system and the current control system, switching of the boosting circuit 10 is PWM-controlled in such a manner that the output voltage Vdc of the boosting circuit 10 becomes the target value Vdcref, and that the current (reactor current) Ia input to the boosting circuit 10 becomes constant.

The inverter control section 50 estimates the speed (rotational speed) of the motor 21 from the detection current (motor current) of the current sensor 27, and PWM-controls the switching of the inverter 20 in such a manner that the estimated speed becomes the target speed corresponding to the magnitude of the load (refrigeration load). The target value setting section 51 sets the minimum output voltage Vdc of the boosting circuit 10 necessary for the output voltage of the inverter 20 to obtain the target speed as the target value Vdcref. That is, the target value Vdcref is determined by the load of the refrigerating cycle, is set low in the case of a low load where the compressor 22 (motor 21) is in the low rotational state, and a larger value is set as the rotational speed of compressor 22 becomes higher (higher load).

The aforementioned full-wave rectifier circuit 2, boosting circuit 10, current sensor 13, inverter 20, current sensor 27, and controller 30 constitute the power supply apparatus of this embodiment.

Next, the control executed by the controller 30 will be described below.

At the time of the high/medium load when the motor 21 rotates at a high/medium speed, the switch element SW1 is turned on/off, and the switch element SW2 is turned on/off oppositely out of phase with the turning on/off of the switch element SW1. Thereby, the output voltage of the full-wave rectifier circuit 2 is boosted by the boosting circuit 10 and is supplied to the inverter 20. At the time of a low load when the motor 21 rotates at a low speed, the switch element SW1 is continuously kept in the off-state, and the switch element SW2 is continuously kept in the on-state. Thereby, the output current of the full-wave rectifier circuit 2 flows into the capacitor 12 passes through the reactor 11 and the switch element SW2. The output voltage of the full-wave rectifier circuit 2 is supplied to the inverter 20 via the capacitor 12 without being boosted.

Figure 2:
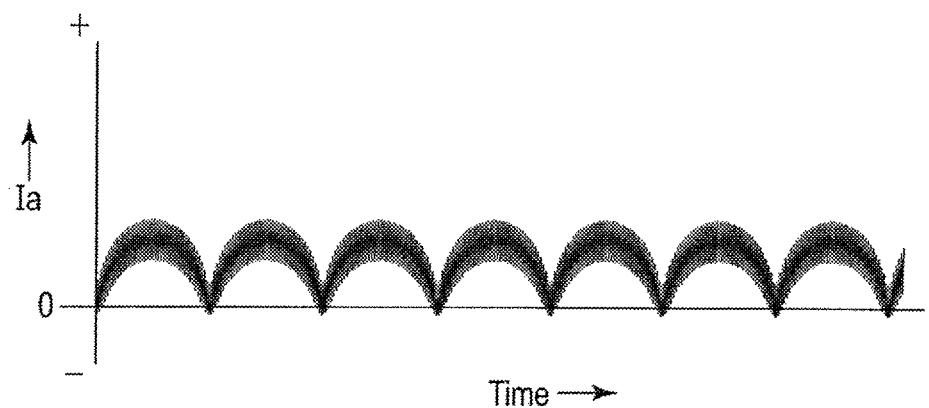
FIG. 2 is a view showing a waveform of the reactor current of a case where protective control by the first embodiment is not carried out.
Figure 3:
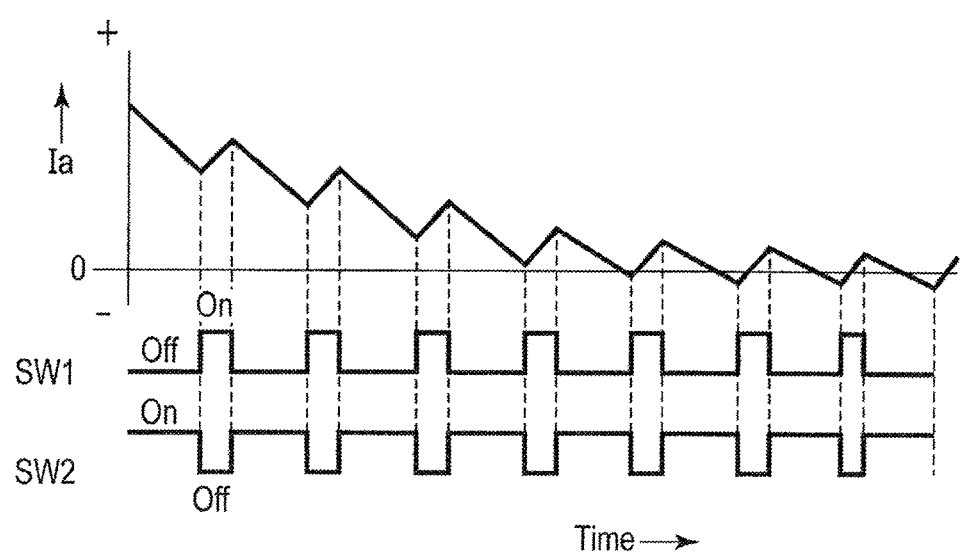
FIG. 3 is a view showing part of the waveform of FIG. 2 in an enlarging manner.

The waveform of the reactor current (instantaneous value) Ia of a case where it is assumed that each of the switch drive control sections 47 and 48 has no protection control means is shown in FIG. 2, and part of the waveform is enlarged and shown in FIG. 3.

That is, concomitantly with an abrupt decrease in the load of the boosting circuit 10, the level of the reactor current Ia lowers to "0" or to a value in the vicinity of "0". Assuming that each of the aforementioned switch drive control sections 47 and 48 has no protection control means when the switch element SW2 is turned on in the state where the level of the reactor current Ia has lowered to "0" or to a value in the vicinity of "0", a current flows in the direction from the capacitor 12 to the AC source 1 in some cases because the switch element SW2 is a MOSFET.

Normally, a current flows through each of the diode elements 2a to 2f of the full-wave rectifier circuit 2 only in the forward direction. However, when the voltage Vdc of the capacitor 12 is in a state where the voltage Vdc is boosted to a voltage higher than or equal to the power-supply voltage, if the switch element SW2 is turned on with the level of the reactor current Ia being in the vicinity of "0", the boosted voltage Vdc of the capacitor 12 is added to the diode elements 2a to 2f of the full-wave rectifier circuit 2 through the switch element SW2 as a reverse voltage because the switch element SW2 is a MOSFET capable of making a current flow in both directions when the switch element SW2 is in the on-state. As a result, as indicated by a broken line arrow in FIG. 1, through the diode elements 2a to 2f through which currents have so far been flowing in the forward direction, a reverse recovery current Ir begins to flow although the duration time of the flow is short. When the reverse recovery current Ir has finished flowing, the diode elements 2a to 2f of the full-wave rectifier circuit 2 block the flow of the reverse recovery current Ir.

It should be noted that even when the switch element SW2 is switched to the off-state in a state where a reverse recovery current Ir flows through the diode elements 2a to 2f of the full-wave rectifier circuit 2, the reverse recovery current Ir flows from the negative side output end of the full-wave rectifier circuit 2 to the positive side output end of the full-wave rectifier circuit 2 through the parasitic diode (diode D1) of the switch element SW1 in the forward direction (back-flow current).

Further, after the reverse recovery current Ir reaches a peak value, the rate of change with time (di/dt) of the negative reactor current −Ia abruptly changes from a negative value to a positive value. At this time, a large counter-electromotive force occurs in the reactor 11, and an excessive surge voltage resulting from the counter-electromotive force is created across the both ends of the reactor 11. When an exorbitant voltage formed by adding the surge voltage and the voltage Vdc of the capacitor 12 together is applied to the output ends of the full-wave rectifier circuit 2, the diode elements 2a to 2f of the full-wave rectifier circuit 2 are broken in some cases.

Figure 4:
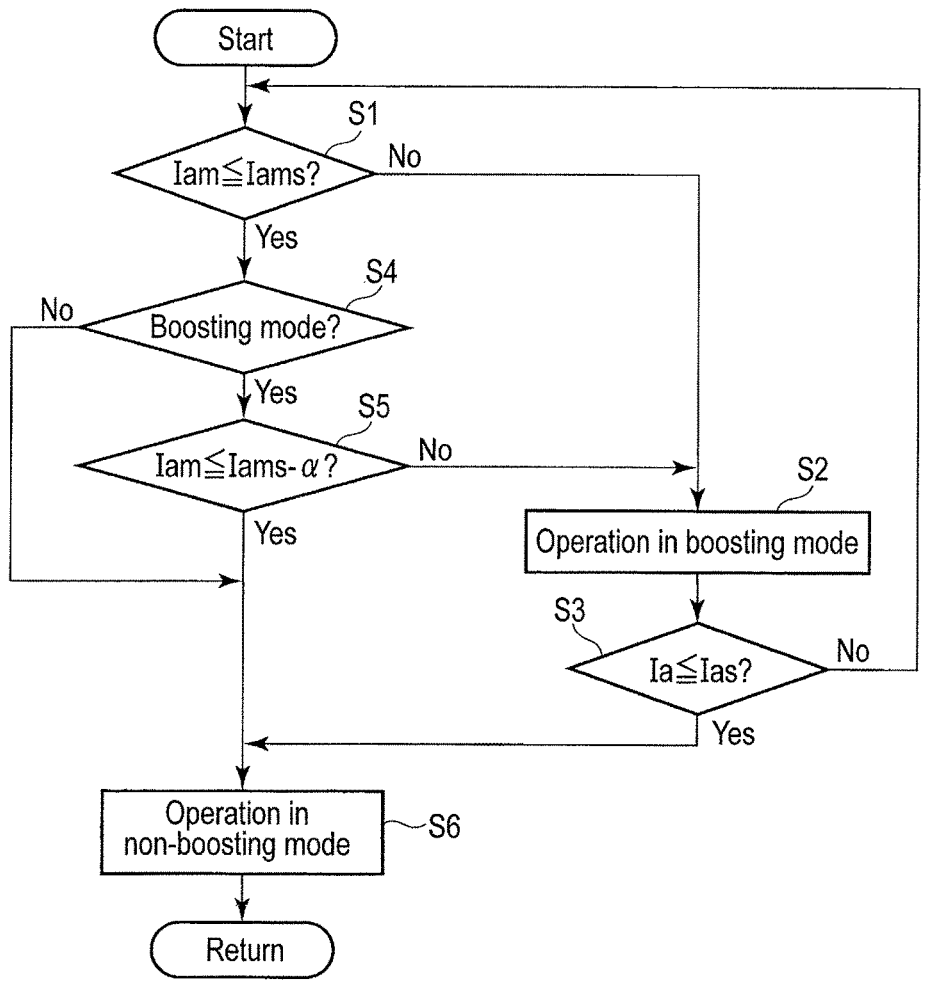
FIG. 4 is a flowchart showing the protective control of the first embodiment.

In order to cope with this problem, the switch drive control sections 47 and 48 execute the control shown in the flowchart of FIG. 4. When the effective value Iam of the reactor current Ia is greater than the set value Iams (NO in step S1), the switch drive control sections 47 and 48 execute an operation in the boosting mode of the boosting circuit 10 (step S2). Concomitantly with the execution of the operation in the boosting mode, the switch drive control sections 47 and 48 return to the determination of step S1 on condition that the reactor current (instantaneous value) Ia is not lower than or equal to the set value Ias (NO in step S3).

When the effective value Iam of the reactor current Ia is smaller than or equal to the set value ams (YES in step S1), the switch drive control sections 47 and 48 determine whether or not the boosting circuit 10 is carrying out the boosting operation (step S4). When the boosting circuit 10 is carrying out the boosting operation (YES in step S4), the switch drive control sections 47 and 48 compare the effective value Iam and the set value "Iams-α" with each other (step S5). When the effective value Iam is not smaller than or equal to the set value "Iams-α" (NO in step S5), the switch drive control sections 47 and 48 continue the boosting operation (step S2). However, when the effective value Iam has already lowered to a value smaller than or equal to the set value "Iams-α" (YES in step S5), the switch drive control sections 47 and 48 switch the operation of the boosting circuit 10 from the boosting mode to the non-boosting mode (step S6). Further, the switch drive control sections 47 and 48 repeat the processing from the first step S1. In addition, when the boosting circuit 10 is not carrying out the boosting operation (NO in step S4), the switch drive control sections 47 and 48 continues the non-boosting mode (step S6).

As the specific movement, when the air conditioning load or the refrigerating load increases while the operation of the refrigerating cycle is carried out, the frequency of the output voltage of the inverter 20 becomes higher, i.e., the rotational speed of the compressor 22 becomes higher, and at the point in time when the effective value Iam of the reactor current Ia increases and just exceeds the set value Iams, the boosting operation is started. Thereafter, the air conditioning load or the refrigerating load is lowered by the operation of the refrigerating cycle, the frequency of the voltage output from the inverter 20 becomes lower, and thereby the effective value Iam of the reactor current Ia is lowered, and at the point in time when the effective value Iam has lowered to a value smaller than or equal to the set value "Iams-α", the operation of the boosting circuit 10 is switched from the boosting mode to the non-boosting mode. The switching between the boosting mode and the non-boosting mode in this case aims at improvement in efficiency. It should be noted that α of the set value "Iams-α" is a hysteresis value, and it is desirable that a be a considerably large value of, for example, about 50% of the set value Ims. By securing the hysteresis value α, frequent switching between the boosting mode and the non-boosting mode is prevented from occurring.

On the other hand, for example, when the load has suddenly decreased due to the transition of the operation to the defrosting operation in which the four-way valve 23 of the refrigerating cycle is reversed, the power to be consumed on the inverter 20 side decreases, and the reactor current Ia lowers. Thus, when the boosting circuit 10 operates in the boosting mode (step S2), if the reactor current (instantaneous value) Ia lowers to a value smaller than or equal to the set value Ias due to an abrupt decrease in the load of the compressor 22 (YES in step S3), the switch drive control sections 47 and 48 switch the operation of the boosting circuit 10 from the boosting mode to the non-boosting mode (step S6).

Figure 5:
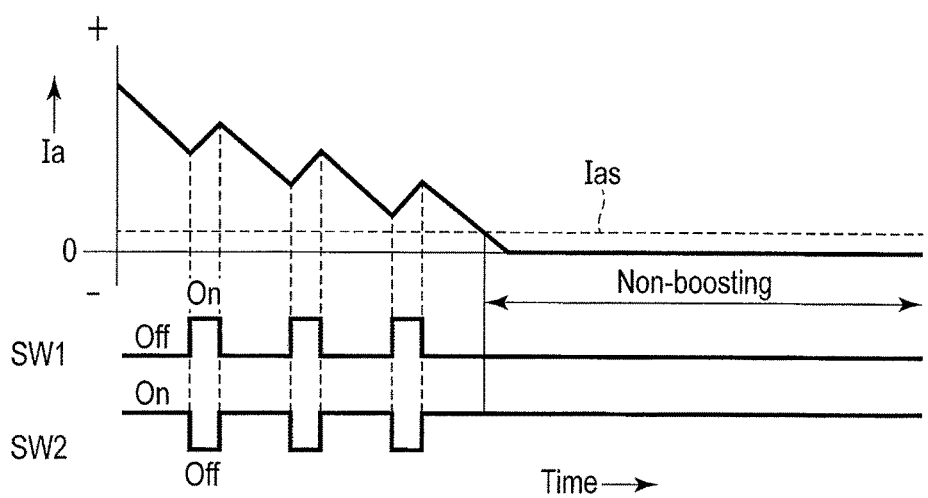
FIG. 5 is a view showing the waveform of the reactor current in the first embodiment.

As described above, the switching for boosting is stopped at the point in time when the reactor current Ia has lowered to a value smaller than or equal to the set value Ias, whereby the subsequent lowering of the reactor current Ia has subsided to the "0" level as shown in FIG. 5, and the reactor current Ia never swings to the negative side.

The negative reactor current −Ia does not flow, and hence even when the switch element SW2 is switched from the off-state to the on-state, it is possible to prevent a situation in which the boosted voltage Vdc of the capacitor 12 is added to the diode elements 2a to 2f of the full-wave rectifier circuit 2 through the switch element SW2 as a reverse voltage from occurring. Accordingly, a reverse recovery current Ir does not flow through the diode elements 2a to 2f of the full-wave rectifier circuit 2, and a surge voltage resulting from the reverse recovery current Ir can be prevented from occurring. That is, an exorbitant voltage formed by adding the surge voltage and the voltage Vdc of the capacitor 12 together is not applied to the output ends of the full-wave rectifier circuit 2, and the diode elements 2a to 2f of the full-wave rectifier circuit 2 can be prevented from being broken.

It should be noted that as described above, although the mode switching control of steps S5 and S6 in which the boosting mode is switched to the non-boosting mode at the point in time when the effective value Iam of the reactor current Ia lowers to a value smaller than or equal to the set value "Iam-α" exists, this mode switching control is insistently the processing to be executed at normal times for the purpose of improving the efficiency. In order to detect (update) the effective value Iam of the reactor current Ia, a period of time corresponding to several cycles of the AC source is required, and hence it is not possible to respond to an abrupt drop in the reactor current (instantaneous value) Ia concomitant with an abrupt decrease in the load by the mode switching control of steps S5 and S6 of the normal time. Thus, in the above embodiment, control of steps S3 and S6 in which when the reactor current (instantaneous value) Ia lowers to a value smaller than or equal to the set value Ias, the boosting mode is switched to the non-boosting mode is additionally provided.

Further, in the above embodiment, in the non-boosting mode, the on-state of the switch element SW2 is continued, whereby the efficiency is improved by making every effort to cause a current not to flow through the backflow prevention diode D2. However, when it is made possible to make a current of an amount of a certain degree flow through the diode D2 by employing an element having a large rated capacity as the backflow prevention diode D2, the off-state of the switch element SW2 may be continued, and a current may be made to flow through the diode D2 only when the control of steps S3 and s6 in which when the reactor current (instantaneous value) Ia lowers to a value smaller than or equal to the set value Ias, the boosting mode is switched to the non-boosting mode is executed. That is, depending on the rated capacity of the diode D2, when at least the off-state of the switch element SW1 is continued, the operation in the switch element SW2 may be either turning on or turning off.

[2] Second Embodiment

In a second embodiment, in place of the protection control of the switch drive control sections 47 and 48 in the first embodiment, as shown in FIG. 6, a capacitor 61 for surge voltage absorption is connected to the output ends of the full-wave rectifier circuit 2. Other configurations are identical to the first embodiment.

The surge voltage occurring when the negative reactor current −Id flows occurs for the reason that the negative reactor current −Id has nowhere to go. Thus, a surge voltage absorbing capacitor 61 is connected to the output ends of the full-wave rectifier circuit 2 to thereby absorb energy of the surge voltage occurring when the negative reactor current −Id flows by means of the capacitor 61. Thereby, an excessive voltage is never applied to the output ends of the full-wave rectifier circuit 2, and thus elements of the full-wave rectifier circuit 2 can be prevented from being broken.

It is necessary to select the capacity of the capacitor 61 in consideration of the amount of energy of the surge voltage occurring when the negative reactor current −Id flows to be absorbed so that the capacitor 61 does not resonate with parasitic inductance on the circuit board or in the circuits. More specifically, when the capacity of the capacitor 61 is large, LC resonance based on the capacitor 61 and parasitic inductance between itself and the switch element SW1, and the parasitic diode (diode D1) occurs, whereby a resonance current flows at timing simultaneous with switching of the switch element SW1 to increase the loss of the switch element SW1. The allowable loss changes depending on the characteristics of the semiconductor switch elements, and the heat dissipation structure of the system in which the semiconductor switch elements are incorporated, and hence it is necessary to select the capacitor 61 having the optimum capacity in consideration of these conditions. Hereinafter, selection of the capacitor 61 (capacity) will be described.

Energy $E_L$ to be accumulated in the reactor 11 when a current flows through the reactor 11 is expressed by the following formula (1). Here, L is an inductance of the reactor 11, and $i_L$ is a reverse current (negative reactor current −Id) flowing through the reactor 11.

$$E_L = \tfrac{1}{2} \times L \times i_L^2 \qquad (1)$$

It is sufficient if the capacity C of the capacitor 61 is determined so that the energy $E_L$ and the energy accumulated in the capacitor 61 may balance with each other.

The initial energy Ec0 accumulated in the capacitor 61 before absorption of the surge voltage is expressed by the following formula (2). The energy Ec1 to be accumulated in the capacitor 61 after absorption of the surge voltage is expressed by the following formula (3). Here, V is the initial voltage of the capacitor 61, ΔV is the allowable amount of a voltage jump at the time of occurrence of the surge voltage.

$$Ec0 = 1/2 \times C \times V^2 \qquad (2)$$

$$Ec1 = 1/2 \times C \times (V + \Delta V)^2 \qquad (3)$$
$$= 1/2 \times C \times V^2 + C \times V \times \Delta V + 1/2 \times C \times \Delta V^2$$

The charged energy Ec of the capacitor 61 is expressed by the following formula (4).

$$Ec = Ec1 - Ec0 = C \times V \times \Delta V + \tfrac{1}{2} \times C \times \Delta V^2 \qquad (4)$$

Assuming that the whole of the energy $E_L$ accumulated in the reactor 11 is charged into the capacitor 61, the formula (1) is made equal to the formula (4) (formula (1)=formula (4)), and this can be replaced with the following formula (5).

$$\tfrac{1}{2} \times L \times i_L{}^2 = C \times V \times \Delta V + \tfrac{1}{2} \times C \times \Delta V^2 \qquad (5)$$

For example, when it is assumed that the inductance L of the reactor 11 is 0.5 mH, the amount of the reverse current flowing through the reactor 11 is 4 A, the initial voltage of the capacitor 61 is 400V, and the allowable amount ΔV of the voltage jump at the time of occurrence of the surge voltage is 100V, and when these values are substituted into the left-hand side of the formula (5), the following formula (6) is obtained.

$$\tfrac{1}{2} \times L \times i_L{}^2 = \tfrac{1}{2} \times 0.5 \times 10^{-3} \times 4^2 = 4.00 \text{ [mJ]} \qquad (6)$$

When the right-hand side of the formula (5) is expanded on the basis of the formula (6), 0.1 µF can be obtained as the capacity C of the capacitor 61 as indicated by the following formula (7).

$$C = (4.00 \times 10^{-3})/(V \times \Delta V + 1/2 \times \Delta V) \qquad (7)$$
$$= (4.00 \times 10^{-3})/(400 \times 100 + 100) \approx 0.1 \text{ [µF]}$$

[3] Third Embodiment

A third embodiment is the combination of the first and second embodiments. Each of the switch drive control sections 47 and 48 includes the protection control means. As shown in FIG. 6, the capacitor 61 for surge voltage absorption connected to the output ends of the full-wave rectifier circuit 2. By the protection control means of the switch drive control sections 47 and 48, and surge voltage absorption of the condenser 61, the diode elements 2a to 2f of the full-wave rectifier circuit 2 can be prevented from being broken. Other configurations are identical to the first and second embodiments.

[4] Fourth Embodiment (Modification Example of Second and Third Embodiments)

In the second and third embodiments, as the main par shown in FIG. 7, the configuration in which a resistor 62 is insertion-arranged in the current path between the output end of the full-wave rectifier circuit 2 and the capacitor 61 may also be employed. That is, the series connection of the resistor 62 and the capacitor 61 constitutes an RC-type snubber circuit for high-voltage absorption.

The capacitor 61 having the optimum capacity is selected, and the capacitor 61 and the resistor 62 constitute the snubber circuit as described in the second and third embodiments, whereby even if resonance occurs, it is possible to prevent the electromagnetic interference (EMI) noise from increasing.

[5] Fifth Embodiment (Modification Example of Second and Third Embodiments)

In the second and third embodiments, as the main part shown in FIG. 8, the configuration in which a resistor 62 is insertion-arranged in the current path between the output end of the full-wave rectifier circuit 2 and the capacitor 61, and a diode 63 for power loss reduction is connected in parallel with the resistor 62 may also be employed. That is, the capacitor 60, the resistor 62, and the diode 63 constitute an RDC-type snubber circuit. By connecting the diode 63 in parallel with the resistor 62, the power loss of the resistor 62 can be reduced.

[6] Sixes Embodiment (Modification Example of Second and Third Embodiments)

Figure 9:
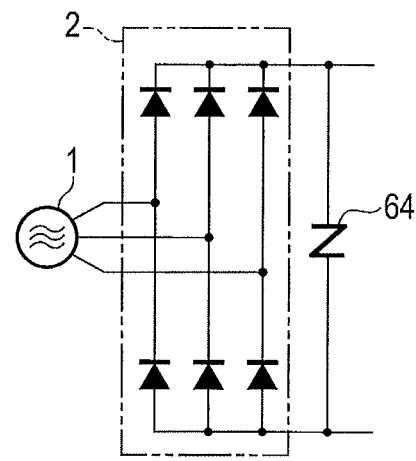
FIG. 9 is a view showing the configuration of a main part of a sixth embodiment.

In the second and third embodiments, although the capacitor 61 for surge voltage absorption has been connected to the output ends of the full-wave rectifier circuit 2, in place of the capacitor 61, a varistor (voltage variable resistor) 64 for surge voltage absorption may also be connected as shown in FIG. 9. Even when a reverse recovery current resulting from the negative reactor current −Ia occurs, and a surge voltage resulting from the reverse recovery current Ir occurs across both ends of the reactor 11, an exorbitant voltage formed by adding the surge voltage and the voltage Vdc of the capacitor 12 together is absorbed in the varistor 64, and is not applied to the output ends of the full-wave rectifier circuit 2. Accordingly, the diode elements 2a to 2f in the full-wave rectifier circuit 2 can be prevented from being broken.

[7] Seventh Embodiment (Modification Example of the above Embodiments)

Figure 10:
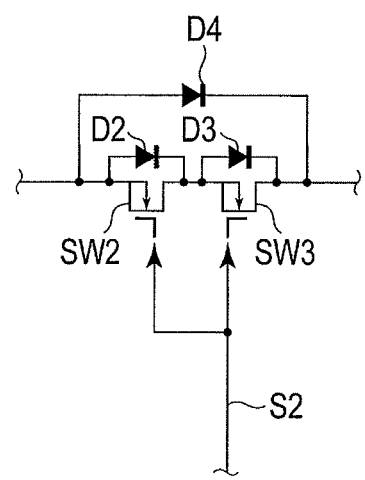
FIG. 10 is a view showing the configuration of a main part of a seventh embodiment.

In each of the aforementioned embodiments, the configuration in which in order to obtain higher efficiency, in place of the switch element SW2, as shown in FIG. 10, a series circuit constituted of a switch element (preceding-stage switch element) SW2, and a switch element (subsequent-stage switch element) SW3 is provided, and a backflow prevention diode D4 is connected in parallel with the series circuit may also be employed. The switch elements SW2 and SW3 are turned on/off in synchronization with each other by a drive signal S2.

The series circuit constituted of the switch elements SW2 and SW3 is a circuit formed by connecting the switch elements SW2 and SW3 in series in directions opposite to each other, and constitutes, together with the backflow prevention diode D4, a high-efficiency switching circuit configured to prevent a reverse recovery current of the parasitic diode D3 of the switch element SW3. The high-efficiency switching circuit is a circuit corresponding to the semiconductor switch circuit described in Jpn. Pat. Appin. KOKAI Publication No. 2015-156795, and effectively prevents a reverse recovery current of the parasitic diode (also called a back-flow diode) D3 of the switch element SW3 from occurring to thereby realize reduction in power loss, and speed-enhancement of the switching speed. By employing the high-efficiency switching circuit, it is possible to obtain efficiency higher than each of the above embodiments.

[8] While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A power supply apparatus comprising:
   a rectifier circuit including diode elements that are arranged in the rectifier circuit and configured to rectify an AC voltage;
   a boosting circuit including:
     a series circuit including a reactor and a first switch element, and connected to output ends of the rectifier circuit;
     a first diode connected in reversely parallel with the first switch element;
     a second diode for backflow prevention arranged in a current path between the first switch element and a load;
     a second switch element which is a MOSFET connected in parallel with the second diode; and
     a capacitor connected in parallel with the load,
   the boosting circuit possessing a function of a first mode in which an output voltage of the rectifier circuit is boosted, and a function of a second mode in which the output voltage of the rectifier circuit is output without being boosted; and
   a controller configured to:
     operate the boosting circuit in the first mode when an effective value (Iam) of a current flowing through the reactor is greater than a first set value (Iams), and switch an operation of the boosting circuit from the first mode to the second mode when the effective value (Iam) of the current flowing through the reactor lowers to a value smaller than or equal to a second set value (Iams-α) which is smaller than the first set value (Iams); and
     when the operation of the boosting circuit is in the first mode, and if an instantaneous value (Ia) of the current flowing through the reactor lowers to a value smaller than or equal to a third set value (Ias) which is smaller than the second set value (Iams-α), switch the operation of the boosting circuit from the first mode to the second mode, wherein
   in the first mode, the boosting circuit turns on/off the first switch element, and turns on/off the second switch element oppositely out of phase with the turning on/off of the first switch element, and
   in the second mode, the boosting circuit keeps the continuous off-state of the first switch element and keeps the continuous on-state of the second switch element.

2. The apparatus according to claim 1, wherein
   the MOSFET includes a parasitic diode, and the power loss in the on-state is smaller than the power loss caused by a voltage drop in the forward direction of the parasitic diode, and
   the diode for backflow prevention is the parasitic diode of the second switch element.

3. The apparatus according to claim 1, wherein the load is an inverter configured to convert the output voltage of the boosting circuit into an AC voltage of a predetermined frequency to thereby output the AC voltage.

4. The apparatus according to claim 1, wherein the load is an inverter configured to convert the output voltage of the boosting circuit into an AC voltage of a predetermined frequency to thereby output the AC voltage as drive power for a brushless DC motor which is an inductive load of the inverter, and is used to drive a compressor.

5. The apparatus according to claim 1, wherein the second switch element is a series circuit constituted of a preceding-stage switch element and a subsequent-stage switch element.

6. The apparatus according to claim 1, wherein in the first mode:
   when the first switch element is turned on, the second switch element is turned off and a current flows from a positive side output terminal of the rectifier through the reactor and the first switch element to a negative side output terminal of the rectifier, and a current does not flow from the capacitor to the second switch element side; and
   when the first switch element is turned off, the second switch element is turned on and a current flows from the reactor through the second switch element to the capacitor with energy accumulated in the reactor, and the current flowing through the capacitor flows through the negative side output terminal of the rectifier.

7. The apparatus according to claim 1, further comprising a current sensor configured to detect the instantaneous value (Ia) of the current flowing through the reactor of the boosting circuit and to provide the detected value (Ia) to the controller.

8. The apparatus according to claim 1, wherein the second set value is a difference (Iams-α) between the first set value (Iams) and a fourth set value (α), said fourth set value (α) being a hysteresis value, and said second set value being set to said difference to prevent frequent switching between the first mode and the second mode from occurring.

* * * * *